(12) United States Patent
Gilra

(10) Patent No.: US 11,113,458 B2
(45) Date of Patent: Sep. 7, 2021

(54) CONCURRENTLY SUPPORTING BOTH DOCUMENT-BASED AND OBJECT-BASED UNDO OPERATIONS

(71) Applicant: Adobe Inc., San Jose, CA (US)

(72) Inventor: Anant Gilra, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 978 days.

(21) Appl. No.: 14/549,952

(22) Filed: Nov. 21, 2014

(65) Prior Publication Data
US 2016/0147721 A1 May 26, 2016

(51) Int. Cl.
*G06F 40/166* (2020.01)
(52) U.S. Cl.
CPC ................... *G06F 40/166* (2020.01)
(58) Field of Classification Search
CPC ..................................... G06F 17/24
USPC .......................................... 715/229
See application file for complete search history.

(56) References Cited

U.S. PATENT DOCUMENTS 7,003,695 B2 * 2/2006 Li ................ G06F 11/3624
714/19
8,838,557 B2 * 9/2014 Bhogal ............ G06F 17/30067
707/695

* cited by examiner

*Primary Examiner* — Kavita Stanley
*Assistant Examiner* — Tionna M Burke
(74) *Attorney, Agent, or Firm* — FIG. 1 Patents

(57) ABSTRACT

During operation of a program, various different editing actions can be performed on data (e.g., image or video data) in a document. The data includes multiple objects, each of which is a user-selectable element of the data, such as a line, a shape, or a filter applied to the data. A record of actions taken on objects in the data is maintained, and the actions can be undone. A document-based undo operation can be performed, which undoes the last action performed in the document. An object-based undo can also be performed, which undoes the last action performed on a selected one or more objects in the document. A document-based redo operation can be performed, which redoes the last action undone in the document. An object-based redo can also be performed, which redoes the last action undone on a selected one or more objects in the document.

20 Claims, 12 Drawing Sheets

CONCURRENTLY SUPPORTING BOTH DOCUMENT-BASED AND OBJECT-BASED UNDO OPERATIONS

BACKGROUND

As computing technology has advanced, numerous programs have been developed to allow people to use computers to generate or edit various types of content, drawings or other images, video, and so forth. While these programs provide many benefits in generating and editing content, they are not without their problems. One such problem is that many programs allow users to undo changes made to the content. However, such undoing of changes is typically an undoing of all changes in an order opposite the order in which the changes were made, a restriction which can result in user frustration and dissatisfaction with the programs they are using.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, multiple sessions are stored in an undo record in a last in first out manner. Each of the multiple sessions indicates an action performed on data of a document as well as one or more objects of the data on which the action was performed. Each of the one or more objects comprises a user-selectable element of the data. A document-based undo operation is performed by undoing an action in a session at a top of the undo record. An object-based undo operation is performed by identifying a topmost session of the undo record that includes a selected object, percolating the identified session to the top of the undo record, and undoing the action in the identified session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
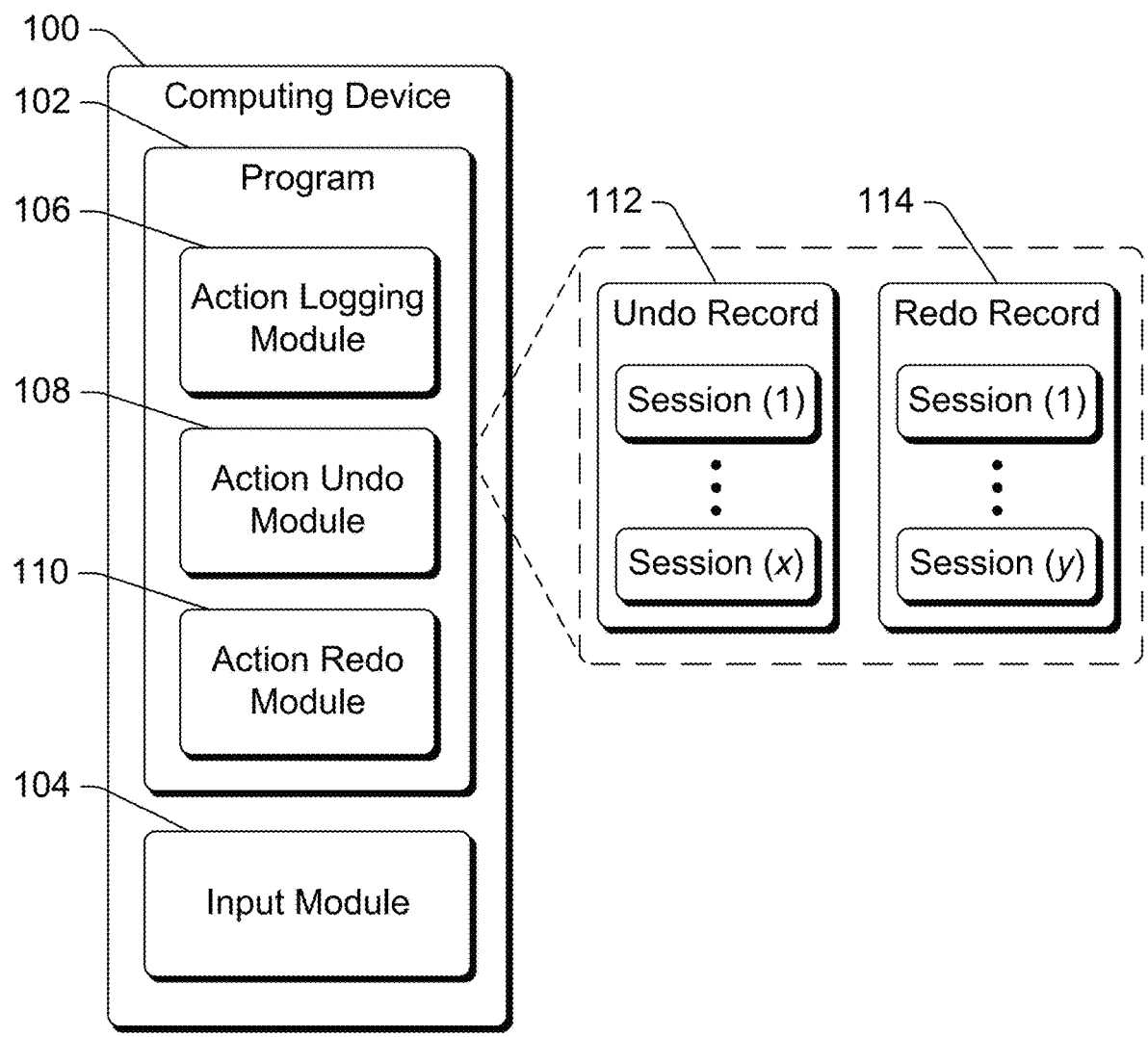
FIG. 1 is a block diagram illustrating an example computing device implementing the concurrently supporting both document-based and object-based undo operations in accordance with one or more embodiments.

Concurrently supporting both document-based and object-based undo operations is discussed herein. During operation of a program, a document containing data is accessed and various different editing actions can be performed on the data, such as adding elements to a drawing, changing colors in an image, changing shadows or filtering of portions of an image, and so forth. The action performed as well as one or more objects of the data on which the action was performed are referred to as a session. For each session, information describing the session is recorded, the information for a session including an indication of the one or more objects in the data that were acted on, as well as an indication of the action performed. Each object in the data refers to a user-selectable element of the data, such as a line, a shape, a filter applied to the data, and so forth.

The session information for each of multiple sessions is recorded in an undo record, allowing the actions in the multiple sessions to be undone. The session information is recorded in a last in first out (LIFO) order, so the session information at the top of the undo record (also referred to as the topmost undo session information) is the session information that was most recently added to the undo record (or percolated to the top, as discussed in more detail below). A document-based undo operation and an object-based undo operation are supported concurrently using the techniques discussed herein. In response to a document-based undo request, the topmost undo session information is accessed, and the action on the one or more objects as indicated in the topmost undo session information is undone.

In response to an object-based undo request, one or more selected objects are associated with the object-based undo request, and a search is made through the undo record to identify the most recent session information (searching in LIFO order) that indicates an action performed on at least one of the one or more selected objects. The identified session information is moved to the top of the undo record, becoming the topmost undo session information. The topmost undo session information is accessed, and the action on the one or more objects as indicated in the topmost undo session information is undone. The one or more selected objects can be selected in different manners. For example, a user of the program may provide an input selecting a single object or multiple objects. By way of another example, the selection of the objects may be automatic and done without user input (e.g., if a zoomed-in view of the data is being displayed, all of the object displayed can be automatically selected).

After being undone (whether due to an object-based undo request or a document-based undo request), the topmost session information can be moved to a redo record. Session information for undone actions is recorded in the redo record in LIFO order, so the session information at the top of the redo record (also referred to as the topmost redo session information) is the session information that was most recently added to the redo record (or percolated to the top, as discussed in more detail below). A document-based redo operation and an object-based redo operation are supported concurrently using the techniques discussed herein, each allowing a previously undone action to be redone (essentially undoing the undo operation). In response to a redo request, the topmost redo session information is accessed, and the action on the one or more objects as indicated in the topmost redo session information is redone. For an object-based redo operation, the topmost redo session information is an identified session that is percolated to the top of the redo record, analogous to the operation of the object-based undo operation.

FIG. 1 is a block diagram illustrating an example computing device 100 implementing the concurrently supporting both document-based and object-based undo operations in accordance with one or more embodiments. The computing device 100 can be a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, the computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes a program 102 and an input module 104. The input module 104 receives user inputs from a user of the computing device 100. User inputs can be provided in a variety of different manners, such as by pressing one or more keys of a keypad or keyboard of the device 100, pressing one or more keys of a controller (e.g., remote control device, mouse, trackpad, etc.) of the device 100, pressing a particular portion of a touchpad or touchscreen of the device 100, pressing one or more buttons of a controller, making a particular gesture on a touchpad or touchscreen of the device 100, and/or making a particular gesture on a controller (e.g., remote control device, mouse, trackpad, etc.) of the device 100. User inputs can also be provided in other manners, such as via audible inputs to a microphone, via motions of hands or other body parts observed by an image capture device, and so forth.

The program 102 can be any of a variety of different computer programs, such as applications, operating system components, and so forth. In one or more embodiments, the program 102 is an image editing program that allows a user of the computing device to capture, edit, or otherwise manipulate data that is one or more images or drawings in a document. The program 102 can alternatively be other types of programs, such as a video editing program that allows a user of the computing device to capture, edit, or otherwise manipulate data that is video (e.g., multiple video frames) in a document. The program 102 allows user inputs to identify various actions to be performed on the data such as by adding to the data, removing parts of the data, modifying parts of the data, and so forth. For example, lines or shapes can be added, opacity of objects can be increased or decreased, colors can be changed, various other filters can be applied to change the appearance of objects, and so forth. The particular actions that can be performed vary based on the particular program 102.

The program 102 also allows at least some actions to be undone, and at least some actions to be redone. Undoing an action refers to returning one or more objects to which the action was applied to their state prior to the action having been performed. For example, if an action is to change the color of an object from blue to green, undoing the action returns the color to blue. Redoing an action refers to again performing an undone action. For example, if an action to change color of an object from blue to green is undone, after the undoing is performed the object is blue. Redoing the action changes the color of the object from blue to green.

The program 102 includes an action logging module 106, an action undo module 108, and an action redo module 110. The action logging module 106 manages the logging or storing of session information for actions that can be undone in an undo record 112. The action undo module 108 manages the undoing of actions that have been logged or stored in the undo record 112. This undoing can be document-based undoing or object-based undoing, as discussed in more detail below. The action redo module 110 manages the redoing of actions that have been logged or stored in the redo record 114. This redoing can be document-based redoing or object-based redoing, as discussed in more detail below.

In one or more embodiments, each of the undo record 112 and the redo record 114 is implemented using a data structure referred to as a modified stack. The modified stack allows operations to be pushed onto the top of the modified stack and popped off the top of the modified stack, as in a traditional stack. However, the modified stack also allows certain session information to be percolated to the top of the modified stack and then popped off the top of the modified stack. This percolation of session information is discussed in more detail below.

Actions are stored in the undo record 112 and the redo record 114 as sessions or session information. Multiple (x) sessions are stored in the undo record 112, and multiple (y) sessions are stored in the redo record 114. Each session in one of the records 112 and 114 includes session information, which indicates an action performed as well as one or more objects of the data on which the action was performed. For example, the session information can indicate that a color was changed from blue to green, and can include identifiers of two different objects the color of which was changed (from blue to green). By way of another example, the session information can indicate that the opacity was changed from 25% to 35%, and can include an identifier of a single object the opacity of which was changed. It should be noted that in one or more embodiments some actions that are performed are not recorded in a session, and that such actions are ignored by the action undo module 108 and the action redo module 110. For example, a create new document action may not be recorded in a session.

Each object in the data refers to a user-selectable element of the data. The particular objects can vary for different programs 102. For example, an object can be a line or a geometric shape. By way of another example, the object can be text (e.g., numbers, letters, or other symbols or characters). By way of yet another example, the data can be made up of multiple different layers with different actions being performed on different layers (e.g., opacity, shading, blurring, or other filters applied on each of different layers, different colors or lines being included on different layers, etc.). Each of these different layers can be an object.

As discussed above, each session indicates an action performed as well as one or more objects of the data on which the action was performed. The session can indicate this information in different manners. In one or more embodiments, the session includes the one or more objects and a state of the action. The session includes, for each of the one or more objects acted on by the action, a before version of the object (the object just prior to being acted on) and an after version of the object (the object just after being acted on). In this situation, the indication of the action performed is the state of the action (e.g., the after version of the object). The before version and the after version of the object can be stored in different manners. For example, the session itself in the record 112 or 114 can include the data structures that store the data of the before version and the after version of the object, or the session in the record 112 or 114 can include a pointer to locations in memory where the before version and the after version of the object are stored.

Alternatively, the session can indicate the action performed as well as one or more objects of the data on which the action was performed in other manners. For example, rather than storing before and after versions of each object acted on, the session can store a pointer to a location in memory where the object is stored. The session can further store an identifier or descriptor of the action performed, such as a code or phrase describing the action, a pointer to a location in memory that describes the action, and so forth. For example, for an action that is changing the number of nodes in a vector (e.g., changing a pentagon to a hexagon), the session can include a pointer to each of one or more objects, and an indication that the before number (the number of nodes in the vector just prior to the change) is five and the after number (the number of nodes in the vector just after the change) is six. By way of another example, for an action that is applying a warp to a bitmap resulting in the dimensions of the bitmap and its shape changing, the session can include a pointer to each of one or more objects, and an indication of the warp that was applied to the bitmap.

Although particular functionality is discussed herein with reference to particular modules, it should be noted that the functionality of individual modules discussed herein can be separated into multiple modules, and/or at least some functionality of multiple modules can be combined into a single module.

Figure 2A:
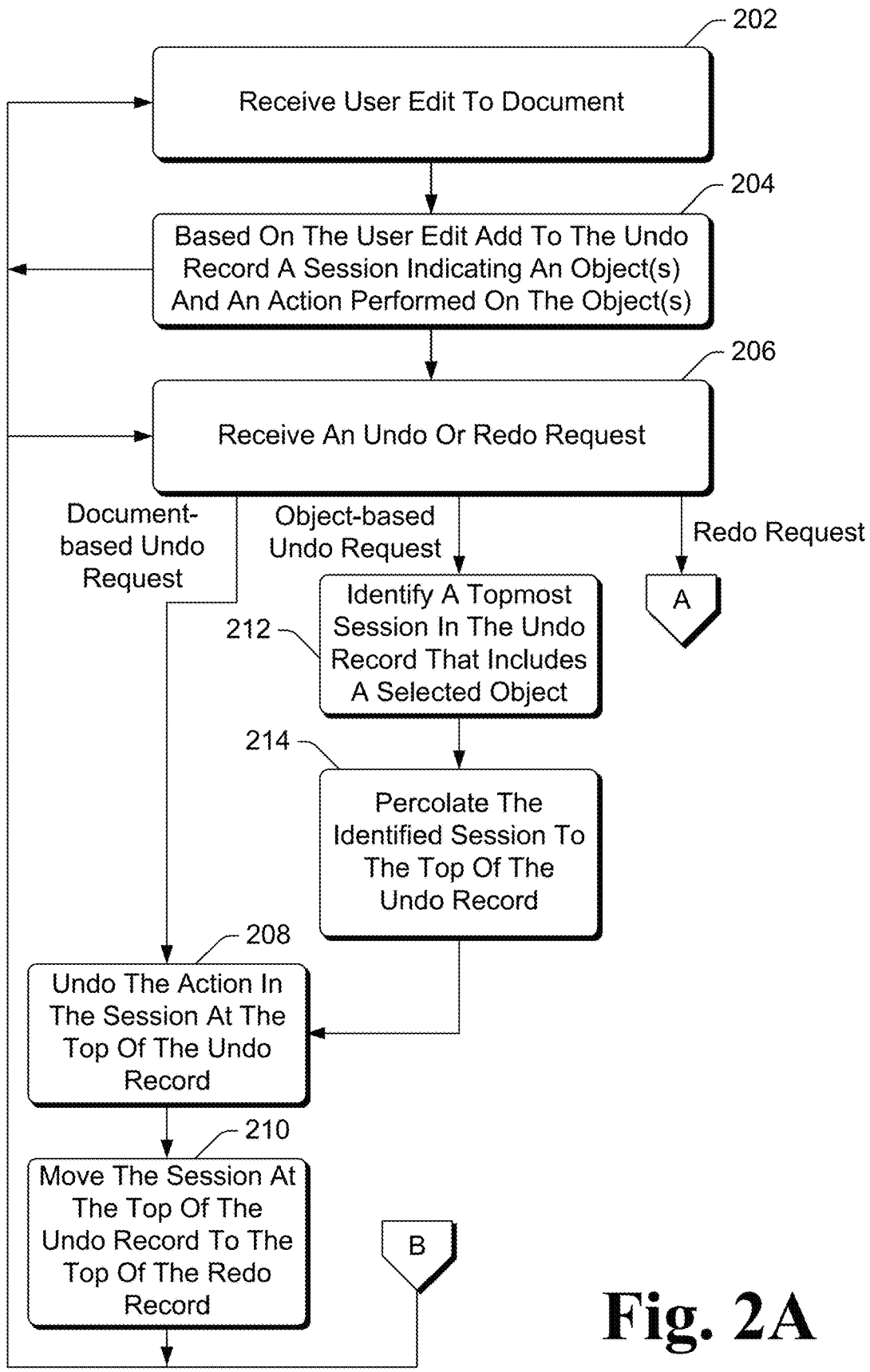
FIGS. 2A and 2B are a flowchart illustrating an example process for concurrently supporting both document-based and object-based undo operations in accordance with one or more embodiments.
Figure 2B:
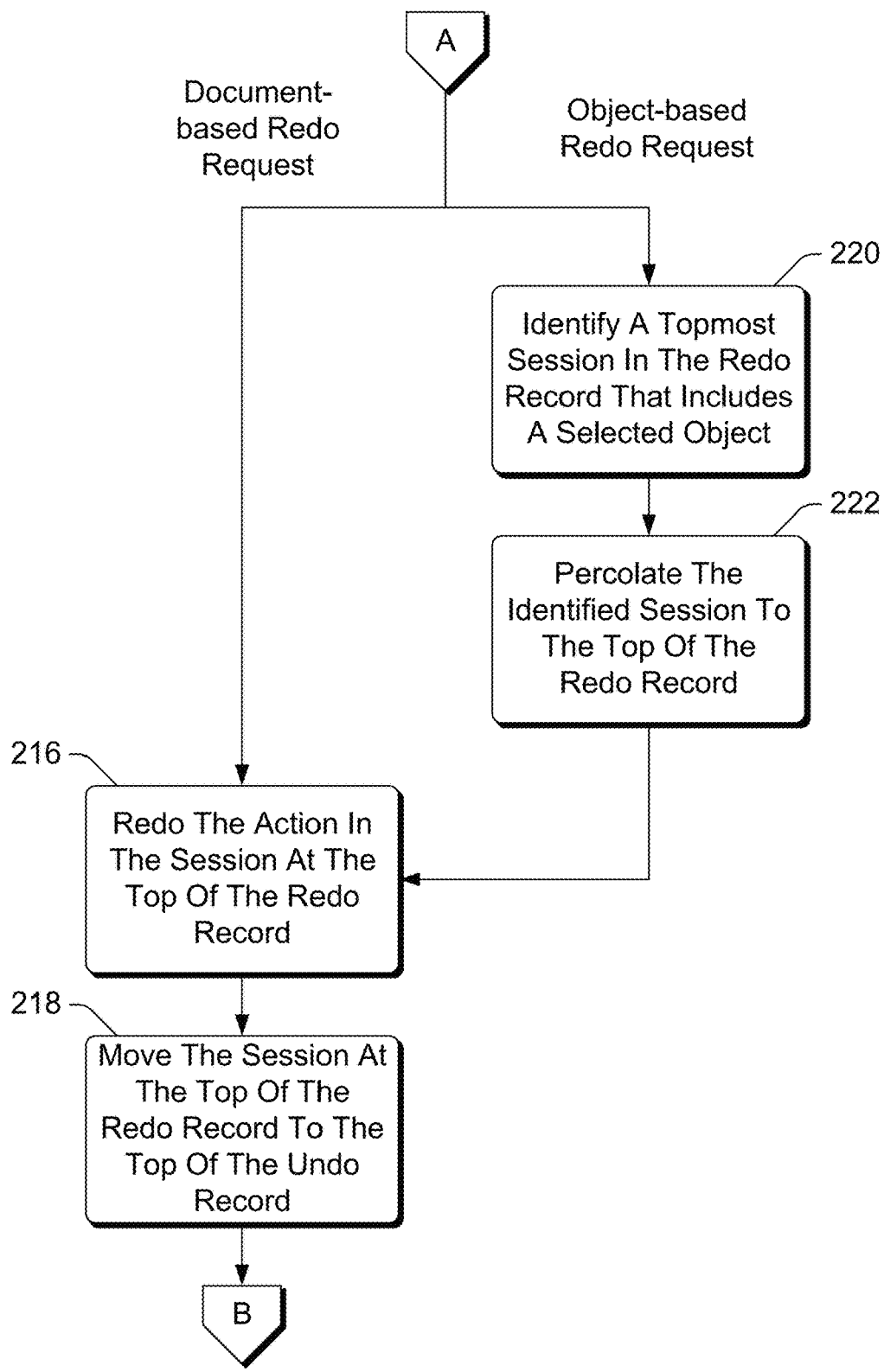

FIGS. 2A and 2B are a flowchart illustrating an example process 200 for concurrently supporting both document-based and object-based undo operations in accordance with one or more embodiments. Process 200 is carried out by a device, such as computing device 100 of FIG. 1, and can be implemented in software, firmware, hardware, or combinations thereof. Process 200 is shown as a set of acts and is not limited to the order shown for performing the operations of the various acts. Process 200 is an example process for concurrently supporting both document-based and object-based undo operations; additional discussions of concurrently supporting both document-based and object-based undo operations are included herein with reference to different figures.

In process 200, user edits to a document are received (act 202). The user edits can be received via any of a variety of user inputs as discussed above. The user edits can be any of a variety of different changes to data of the document, and include an action performed on one or more objects as discussed above.

A session identifying one or more objects of the data as well as an action performed on those one or more objects is added to the undo record (act 204). The action and objects are based on the user edit received in act 202, as the user input indicates the one or more objects and the action.

Acts 202 and 204 can be repeated any number of times, with a session being added to the undo record each time. The sessions are added in LIFO order, so each session can be viewed as being put on the top of the undo record each time act 204 is performed.

Figure 3:
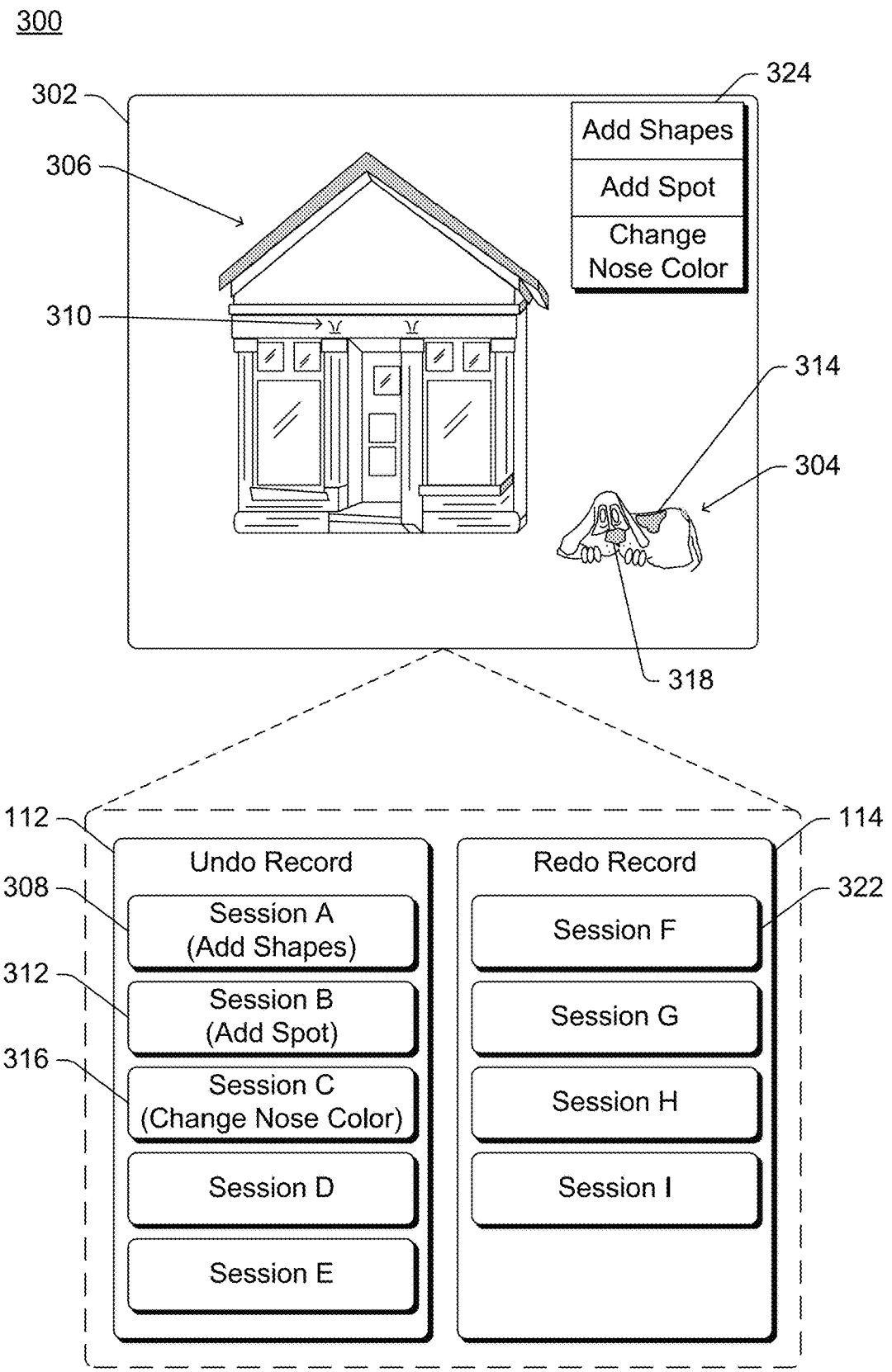
FIGS. 3, 4, 5, 6, 7, 8, 9, and 10 illustrate examples of different objects and of using an undo record and a redo record in accordance with one or more embodiments.

FIGS. 3-9 illustrate examples of different objects and of using an undo record and a redo record in accordance with one or more embodiments. FIG. 3 illustrates an example 300 of data 302 being edited by and displayed to a user, the displayed data 302 being a drawing including a dog 304 and a building 306. Multiple sessions have previously been added to the undo record 112 and to the redo record 114. The most recent session added to the undo record 112 is a session 308 indicating an action of adding shapes 310 (the shapes 310 being the objects) to the building 306. A next most recent session added to the undo record 112 is a session 312 indicating an action of adding a spot 314 (the spot 314 being the object) to the dog 304. A next most recent session added to the undo record 112 is a session 316 indicating an action of changing a color of the nose 318 (the nose 318 being the object) of the dog 304. Any number of additional sessions can also be included in the undo record 112. Sessions are added to the undo record 112 in a LIFO manner, so the topmost session in the undo record 112 is the session 308.

Any number of sessions can also be included in the redo record 114. Sessions are added to the redo record 114 in a LIFO manner, so the topmost session in the redo record 114 is the session 322. A session is added to the redo record 114 in response to an undo operation (document-based undo or object-based undo, as discussed in more detail below), which moves the topmost session of the undo record 112 to the top of the redo record 114 (e.g., pops the topmost session from the undo record 112 and pushes that session onto the redo record 114). Sessions are not added to the redo record 114 other than those that are undone (and moved from the top of the undo record 112 to the top of the redo record 114).

In one or more embodiments, a redo operation (document-based redo or object-based redo, as discussed in more detail below), can be performed only if there is at least one session in the undo record 112. If the undo record 112 is empty, then a redo operation is not performed in response to a redo request.

Additionally, in one or more embodiments, in response to a redo request, the topmost session of the redo record 114 is moved to the top of the undo record 112. The session that is next closest to the top then becomes the topmost session of the redo record 114 (e.g., Session G becomes the topmost session). However, if a new session is added to the undo record 112 (other than in response to a redo request), then the redo record 114 is deleted or emptied. The redo record 114 remains empty until an undo operation is performed (which moves a session to the redo record 114 as discussed above).

A history list 324 or other indication of the undo record 112 can optionally be displayed in conjunction with the displayed data 302. The history list identifies the actions that were performed in the sessions in the undo record 112, providing a user with a visual indication of what actions were done and can be undone. Although not illustrated in FIG. 3, an indication of the redo record 114 can analogously be displayed in conjunction with the displayed data 302. The indication of the redo record 114 can be the redo record 114 inverted and situated above the history list 324, and a slider can be moved through the combined indications of the undo record 112 and the redo record to undo or redo multiple sessions at a time (performing document-based undo or document-based redo).

Returning to FIG. 2A, an undo request or redo request can be received (act 206). The undo request can be a document-based undo or an object-based undo request. The requests can be received via any of a variety of user inputs as discussed above. For example, different key sequences may be used for each of the document-based undo, object-based undo, document-based redo, and object-based redo requests. By way of another example, different touchscreen gestures or audible inputs may be used for each of the document-based undo, object-based undo, document-based redo, and object-based redo requests.

In response to receipt of a document-based undo request, the action in the session at the top of the undo record is undone (act 208). The action is undone by returning the one or more objects identified in the topmost session of the undo record to its state prior to the action having been done.

The session at the top of the undo record is also moved to the top of the redo record (act 210). The moved session is thus no longer included in the undo record. Process 200 then returns to receive another undo request or redo request in act 206, or a user edit in act 202.

Figure 4:
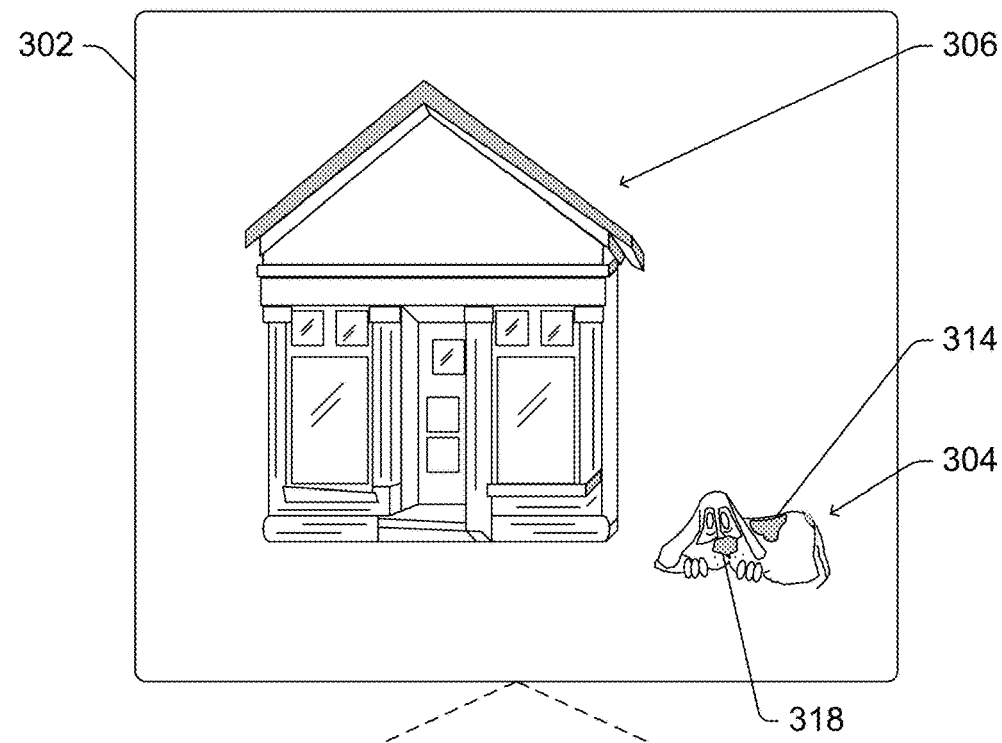
Figure 4:
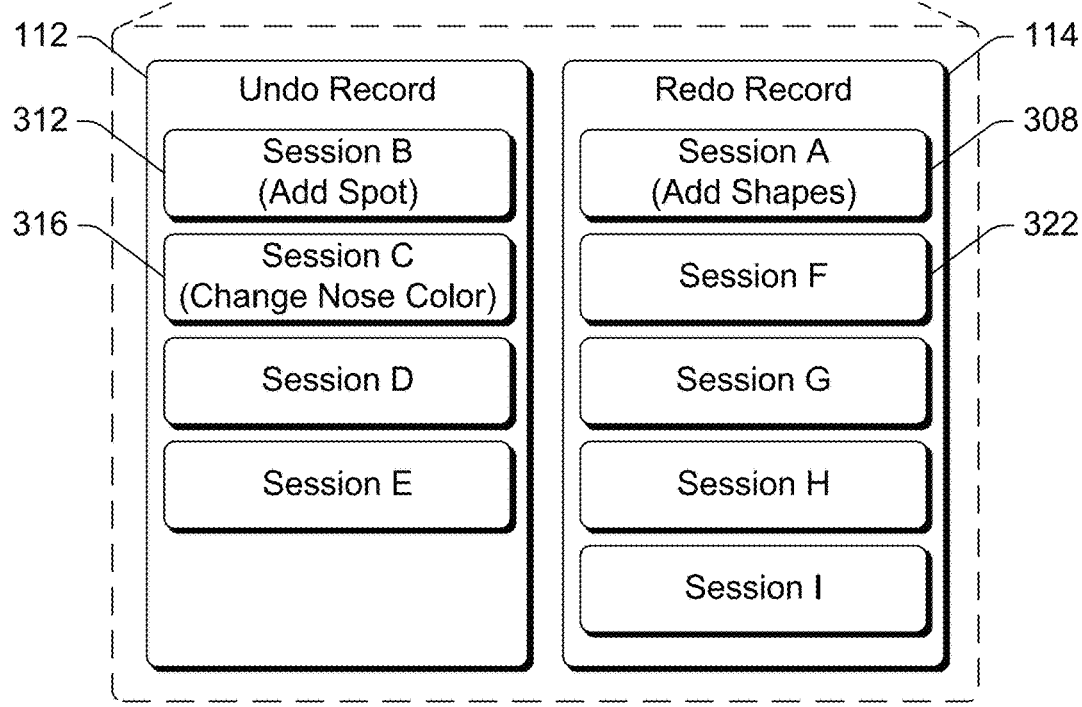

FIG. 4 illustrates an example 400 of the displayed data 302 of FIG. 3 after a document-based undo request has been received and performed in accordance with one or more embodiments. The topmost session of the undo record 112 was the session 308, so the adding of shapes 310 is undone. Thus, the shapes 310 illustrated in FIG. 3 are not present in the displayed data 302 of FIG. 4. The session 308 has been moved to the top of the redo record 114, so the session 308 is no longer part of the undo record 112 but is now the topmost session of the redo record 114. The session 312 is now the topmost session of the undo record 112.

Returning to FIG. 2A, In response to receipt of an object-based undo request, a topmost session in the undo record that includes a selected object is identified (act 212). The object-based undo request has a corresponding one or more selected objects for which the undo operation is to be performed. The one or more selected objects can be a single object selected by the user or multiple objects selected by the user. The user selection can be made by providing various user inputs as discussed above. For example, one or more objects may be clicked on with a cursor control device, one or more objects may be touched with a finger or stylus via a touchscreen, a rectangular area may be drawn around a portion of the display of the data and all objects included (wholly, or alternatively at least in part) within the rectangular area are selected, and so forth. Feedback indicating the selected one or more objects can optionally be provided, such as by displaying the objects (or an outline of the objects) with a particular color or line.

Figure 5:
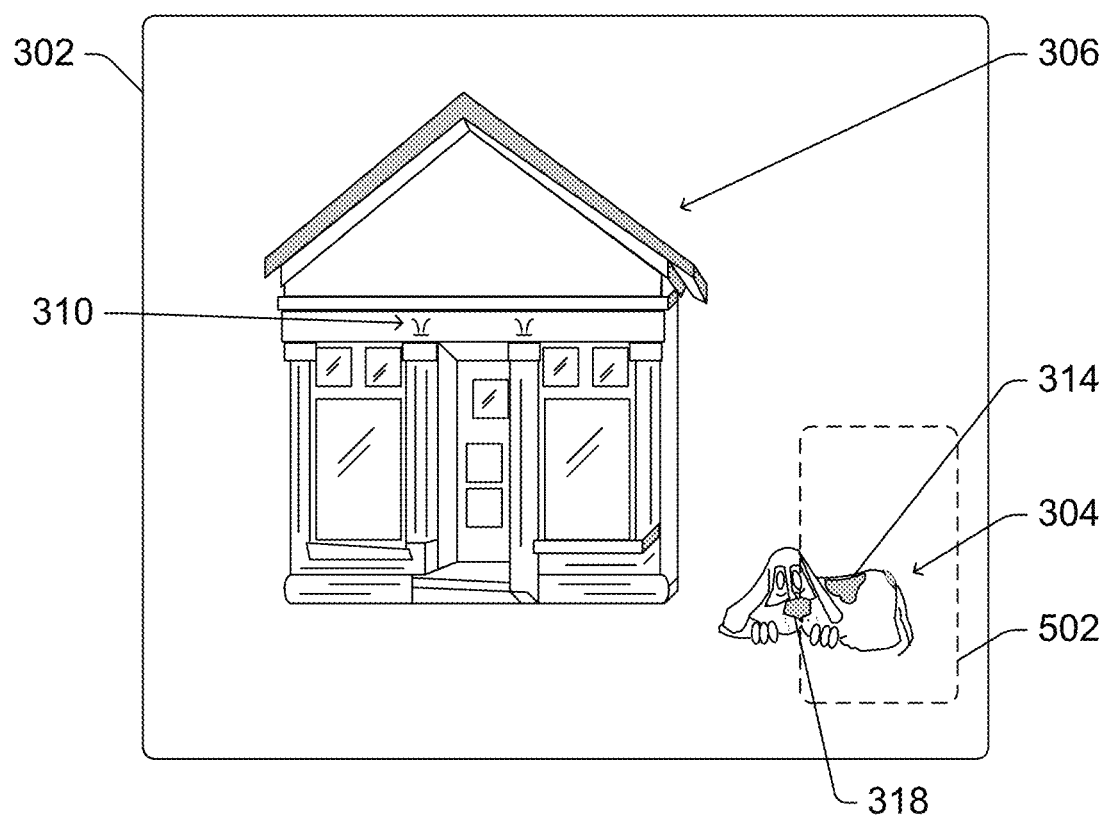

FIG. 5 illustrates an example 500 of the displayed data 302 of FIG. 3 and the selections of objects that can be performed on the displayed data 302 in accordance with one or more embodiments. For example, a user input touching or clicking on the nose 318 can be selection the nose 318 of the dog 304. By way of another example, a user input touching or clicking on the nose 318 followed by the spot 314 can be selection of both the nose 318 and the spot 314 of the dog 304.

A user input drawing a rectangle, illustrated as dashed line rectangle 502, around a portion of the displayed data 302 is a selection of all objects within the rectangle 502. An object can be within the rectangle 502 if the object is wholly within the rectangle 502 (e.g., all of the object is included in the rectangle 502), or alternatively an object can be within the rectangle 502 if the object is at least partly within the rectangle 502. For example, the spot 314 is wholly within the rectangle 502 and thus is selected. The nose 318 is partly within the rectangle 502, and thus is not selected in one or more embodiments, and is selected in other embodiments.

It should be noted that an object need not be visible or fully visible to the user in order to be selected. For example, multiple objects may be included in the image but are currently covered by the spot 314 of the dog 304. These multiple objects are within the rectangle 502 and thus are selected. By way of another example, a layer that applies a filter to the spot 314 of the dog 304 may be invisible or partially visible (also referred to as partially obscured) to the user, but is included within the rectangle 502 and thus is selected. By way of yet another example, an object having a transparency of 100% may be adjacent to the dog 304 and within the rectangle 502, but be invisible to the user due to the transparency being 100%.

Returning to FIG. 2A, the selection of one or more objects can also be automatic, and can be made in the absence of any user selection of the one or more objects. Various different rules or criteria can be applied to identify which objects are selected. In one or more embodiments, all objects included in a portion of the displayed data 302 that is displayed are automatically selected. For example, a user may zoom in on part of the displayed data 302, and the objects included in the zoomed-in portion are the objects that are automatically selected.

Figure 6:
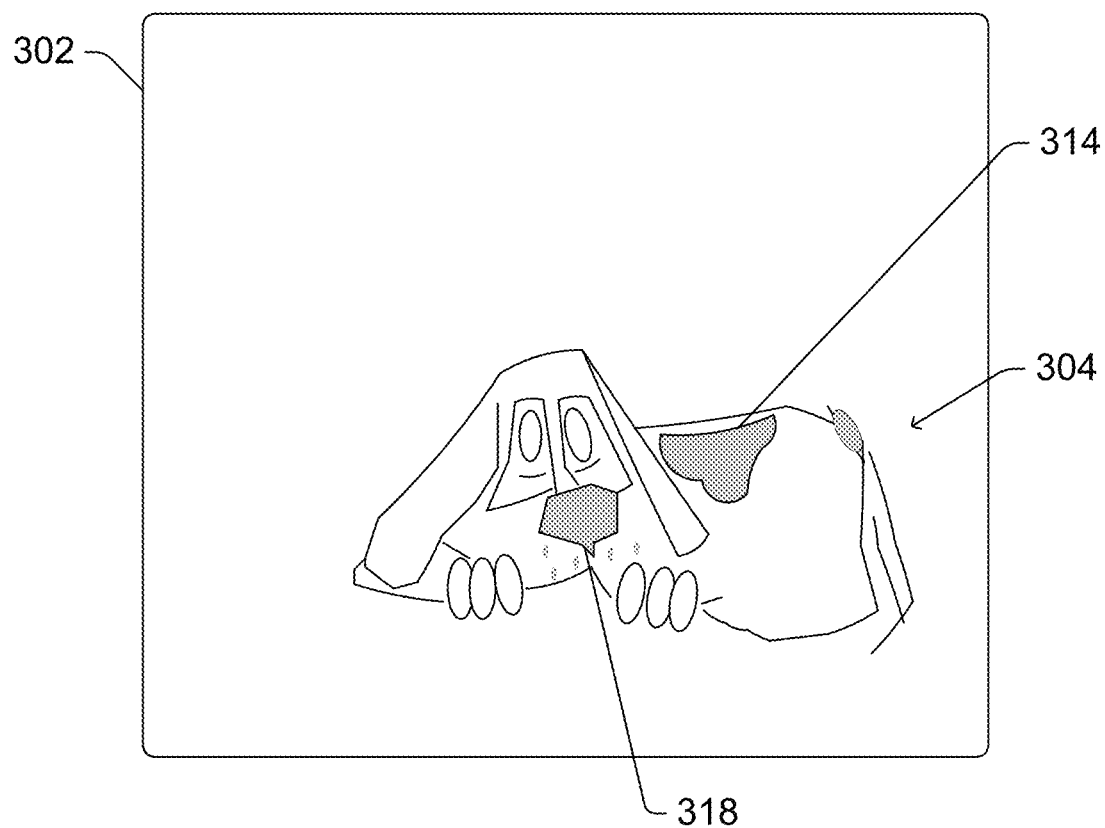

FIG. 6 illustrates an example 600 of the displayed data 302 of FIG. 3 and the selections of objects that can be performed on the displayed data 302 in accordance with one or more embodiments. In the example 600, the dog 304 is zoomed in on, so the dog 304 is the displayed data 302 displayed but the building 306 of FIG. 3 is not displayed. In the example 600, all of the objects included in the portion displayed (the dog 304) are automatically selected, but other objects (e.g., the building 306 of FIG. 3) are not selected.

Returning to FIG. 2A, data can include one or more collections of objects referred to as symbols. For example, the dog 304 of FIG. 6 can be a symbol, and if the user zooms in so that only a single symbol is displayed (or if the symbol is opened, such as by being clicked on, for editing), all of the objects in that symbol can be automatically selected. All of the objects in that symbol can be automatically selected regardless of whether the objects are currently being displayed, or alternatively only objects currently being displayed are automatically selected.

Situations can also arise in which data is stored on multiple different pages of a document. For example, an image document may include multiple different pages (also referred to as sheets), with different data on each page. Each page can also have multiple frames (e.g., one or more animations, each animation being made up of multiple frames) with different data in each frame, and different frames on each page. By way of another example, a video may include multiple pages (also referred to as sheets), with different data on each page. In such situations, all objects displayed in the currently displayed page are automatically selected.

Figure 7:
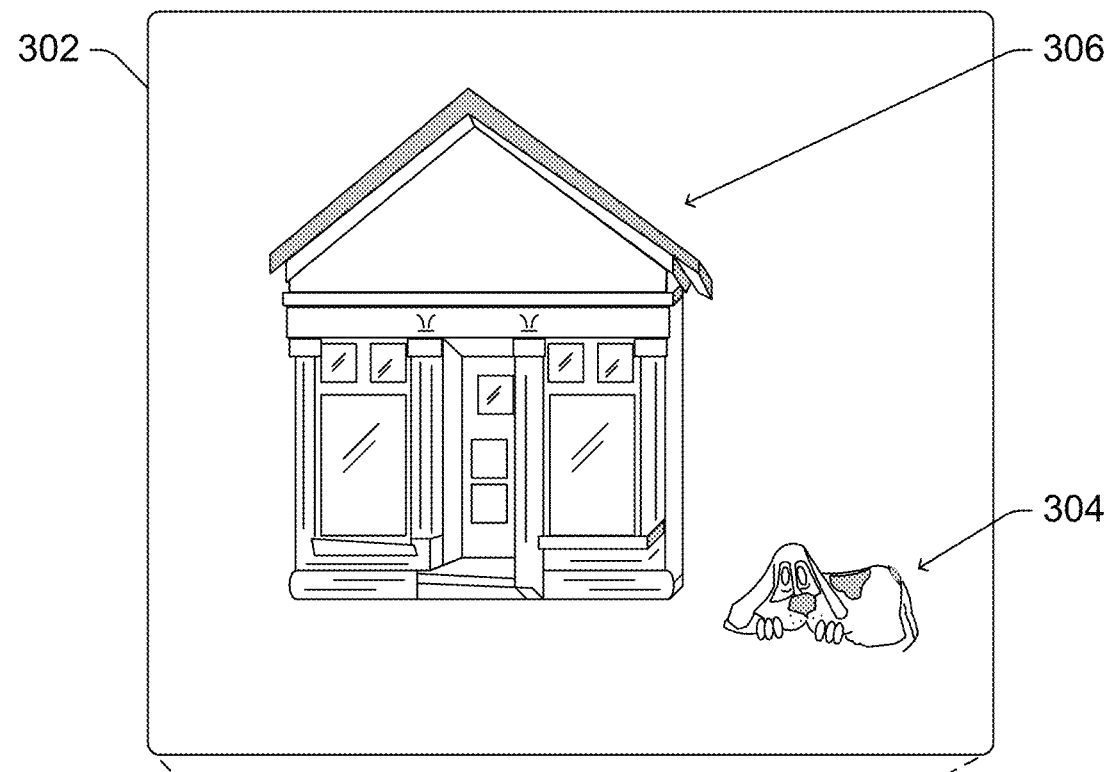
Figure 7:
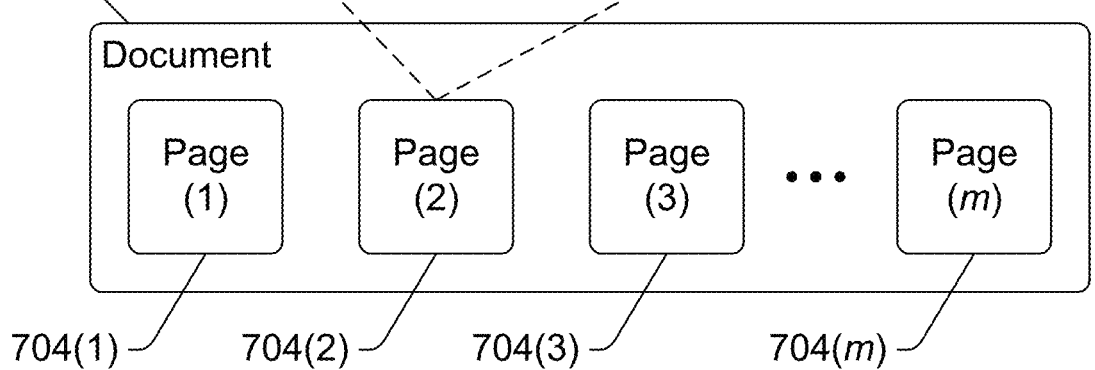

FIG. 7 illustrates an example 700 of the displayed data 302 of FIG. 3 and the selections of objects that can be performed on the displayed data 302 in accordance with one or more embodiments. In the example 700, a document 702 includes multiple (m) pages 704(1), . . . , 704(m). Each of the pages 704(1), . . . , 704(m) can include different data, and the page 704(2) includes the displayed data 302. All of the objects of the page 704(1), . . . , 704(m) being displayed by the program 102 are automatically selected. For example, if page 704(2) were being displayed, then all of the objects in the displayed data 302 are automatically selected.

In one or more embodiments, which objects are automatically selected is made in a hierarchical manner. The objects in the lowest level (the most drilled-down level) of the document that is currently being displayed or operated on (e.g., edited by) the user are automatically selected.

For example, assume that a document includes different hierarchical levels, from lowest level to highest level, of: a symbol level, a frame level, a page level, and a document level. At the symbol level is one or more symbols (each symbol being a collection of objects as discussed above). At the frame level is one or more frames, each of which can include one or more objects and/or one or more symbols. At the page level is one or more pages, each of which can include one or more objects, one or more frames, and/or one or more symbols. At the document level is a document that includes one or more pages. The objects in the lowest level (the most drilled-down level) of the document that is currently being displayed or operated on (e.g., edited by) the user are automatically selected. For example, if a symbol has been opened and is being operated on (e.g., edited by the user), then all of the objects in that symbol are automatically selected. By way of another example, if a page has been opened and is being operated on (e.g., edited by the user), and the page includes symbols but none of those symbols has been opened and is being operated on, then all of the objects on that page are automatically selected.

Returning to FIG. 2A, the identification of which objects are selected for the object-based undo request is made based on whether any objects have been selected by the user. If a single object is selected by the user, then that single object is the selected object for the object-based undo request. If multiple objects are selected by the user, then those multiple objects the selected objects for the object-based undo request. If no objects are selected by the user, then the objects in the portion of the document that is currently being displayed by the program 102 are automatically selected. That portion can be a portion of a page (e.g., a portion that is zoomed in on or otherwise expanded), an entire page, a set of pages, and so forth.

Regardless of how objects are selected, one or more objects are selected as part of the object-based undo request. In act 212, the undo record is searched in LIFO order to identify a topmost session that includes at least one of the selected objects. For example, returning to FIG. 3, the top of the undo record 112 (also referred to as the top session or the topmost session of the undo record 112) is the session 308, and the undo record 112 is searched in the following order: session 308, followed by session 312, followed by session 316, and so forth. The topmost session that includes a selected object refers to the session closest to the top of the undo record 112 that includes at least one of the one or more selected objects. For example, if the selected object is the nose 318 of the dog 304, then the topmost session of the undo record 112 that includes the nose 318 is the session 316.

It should be noted that in act 212, the undo record 112 is searched to identify a topmost session that includes at least one of the selected objects. A session that includes one or more of the selected objects is identified—the session need not include all of the selected objects.

The undo record 112 can be searched in different manners. In one or more embodiments, when one or more objects are selected as part of the object-based undo, the program 102 identifies the pointers to the locations in memory where the different selected objects are stored. These pointers are also used as part of the session information for the sessions in the undo record 112, as discussed above. A session that includes a particular object can thus be readily identified by comparing the pointers of the selected one or more objects to the pointers in the sessions, and identifying a session that includes a pointer that is the same as one of the pointers of the selected one or more objects. One or more sessions can optionally include pointers to before and after versions of the object, in which case a session that includes a particular object can thus be readily identified by comparing the pointers of the selected one or more objects to the pointers of the after versions of objects in the sessions, and identifying a session that includes a pointer to an after version of an object that is the same as one of the pointers of the selected one or more objects.

The identified session is percolated to the top of the undo record (act 214). Percolating the identified session to the top of the undo record refers to moving the identified session from its current location in the undo record to the top of the undo record. If an indication of the undo record is displayed (e.g., the history list 324 of FIG. 3), a visual indication can be provided to show the percolation of the identified session to the top of the undo record (e.g., an animation showing the action in the history list moving to the top of the undo record).

Figure 8:
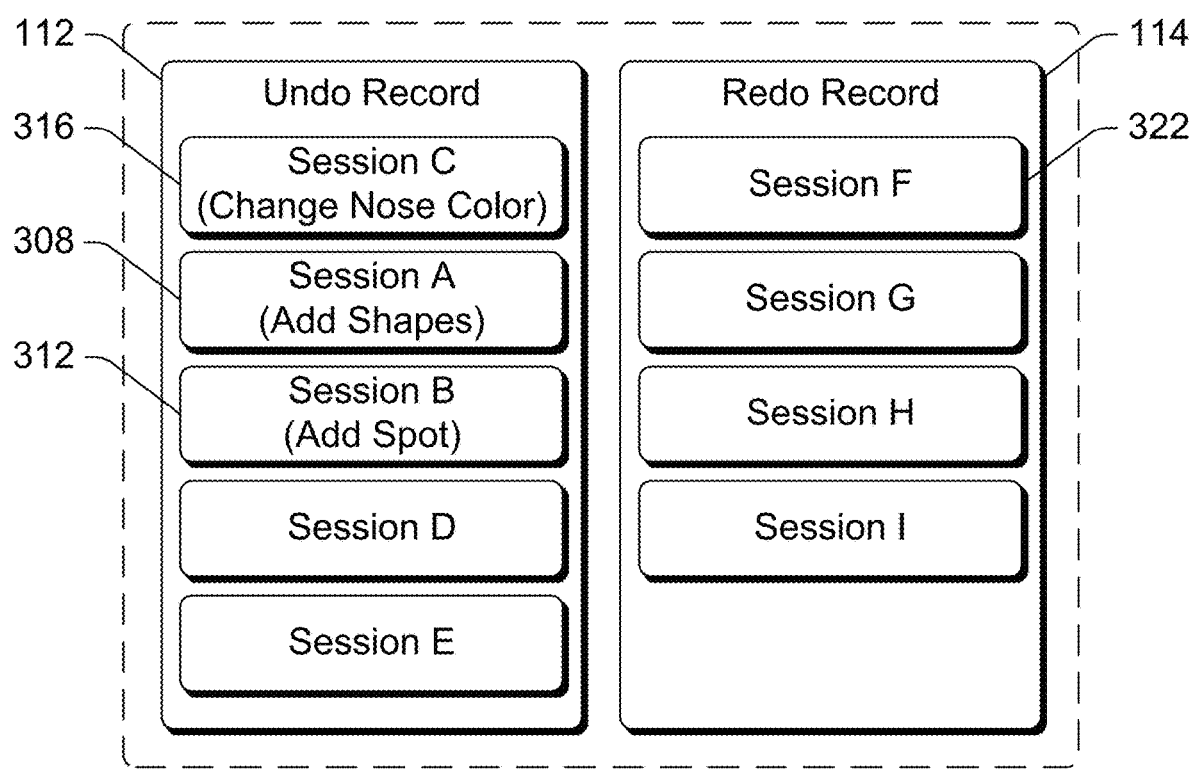

FIG. 8 illustrates an example 800 of percolating the identified session to the top of the undo record in accordance with one or more embodiments. The example 800 illustrates the example where the identified session is session 316. The identified session 316 from FIG. 3 is percolated to the top of the undo record 112, and is now the topmost session of the undo record 112.

Returning to FIG. 2A, the action in the session at the top of the undo record is undone (act 208). The action is undone by returning the one or more objects identified in the topmost session of the undo record to its state prior to the action having been done. Because the identified session was percolated to the top of the undo record in act 214, the identified session is the session at the top of the undo record and thus is the session the action of which is undone.

The session at the top of the undo record is also moved to the top of the redo record (act 210). The moved session is thus no longer included in the undo record. Process 200 then returns to receive another undo request or redo record in act 206, or a user edit in act 202.

Figure 9:
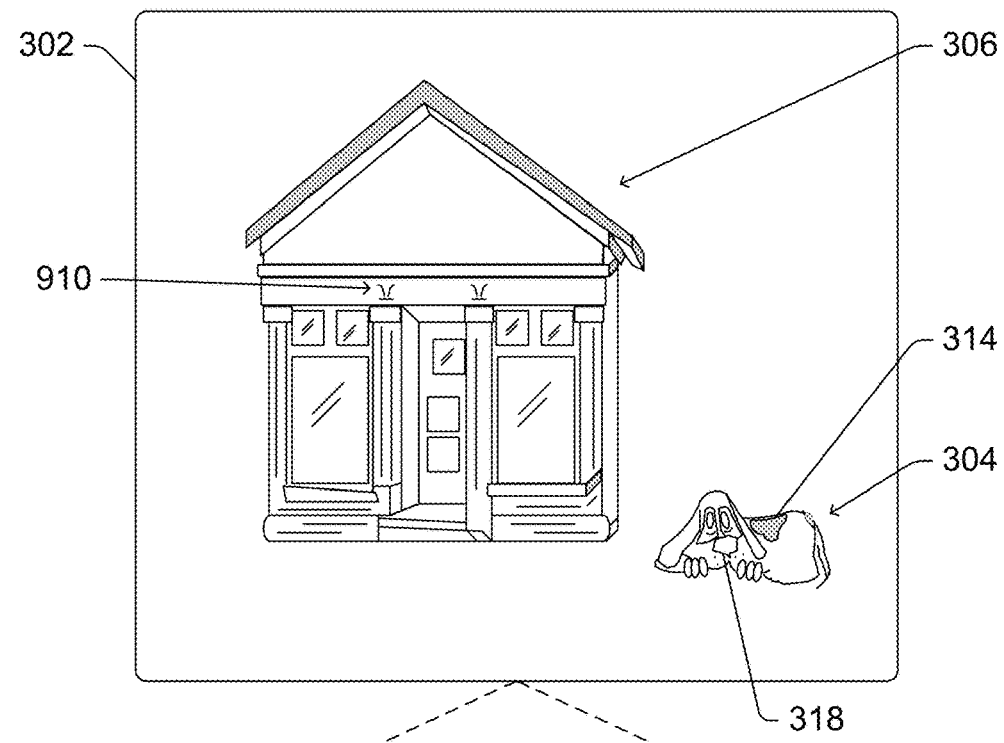
Figure 9:
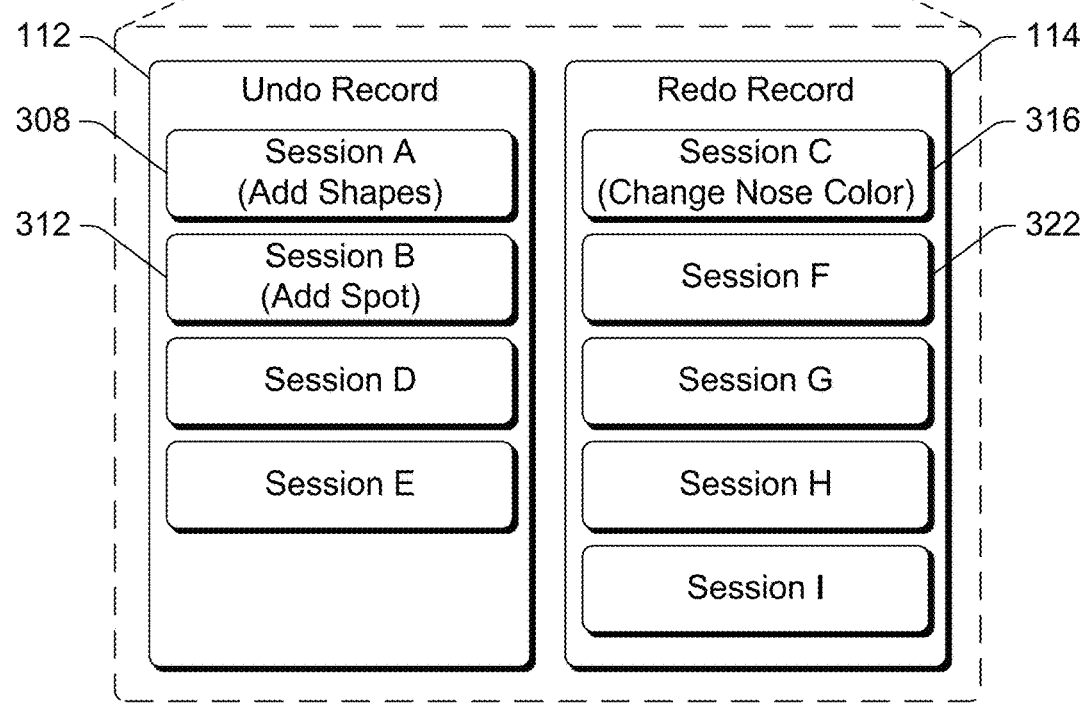

FIG. 9 illustrates an example 900 of the displayed data 302 of FIG. 3 after an object-based undo request has been received and performed in accordance with one or more embodiments. The topmost session of the undo record 112 (as illustrated in the example 800 of FIG. 8) was the session 316, so the changing the color of the nose 318 of the dog 304 is undone. Thus, the color of the nose 318 is changed to its previous color (before the action in session 316 was performed) as illustrated in FIG. 9. The session 316 has been moved to the top of the redo record 114, so the session 316 is no longer part of the undo record 112 but is now the topmost session of the redo record 114. The session 308 is now the topmost session of the undo record 112.

Returning to FIG. 2A, the session including the action being undone in act 208 can identify multiple objects for which the action is undone, as discussed above. In one or more embodiments, the session also includes an indication of the order in which the action was performed on the objects (e.g., the object to which the action was initially applied, followed by the object to which the action was next applied, and so forth). In such embodiments, when the action is undone in act 208, the action is undone in the reverse order that the action was performed on the objects. Thus, the last object on which the action was performed is the initial object on which the action is undone, and the initial object on which the action was performed is the last object on which the action is undone.

It should be noted that the identified session in act 212 is a session that includes at least one of the selected objects (whether selected by user input or automatically) as discussed above. The identified session need not include all of the selected objects, and thus the undoing of the action in act 208 may not result in an action being undone on all of the selected objects. However, if the identified session includes multiple objects (at least one of which is a selected object), then the undoing of the action in act 208 results in the action being undone on all of the multiple objects included in the identified session (regardless of whether all of those multiple objects were selected objects corresponding to the object-based undo request).

Figure 10:
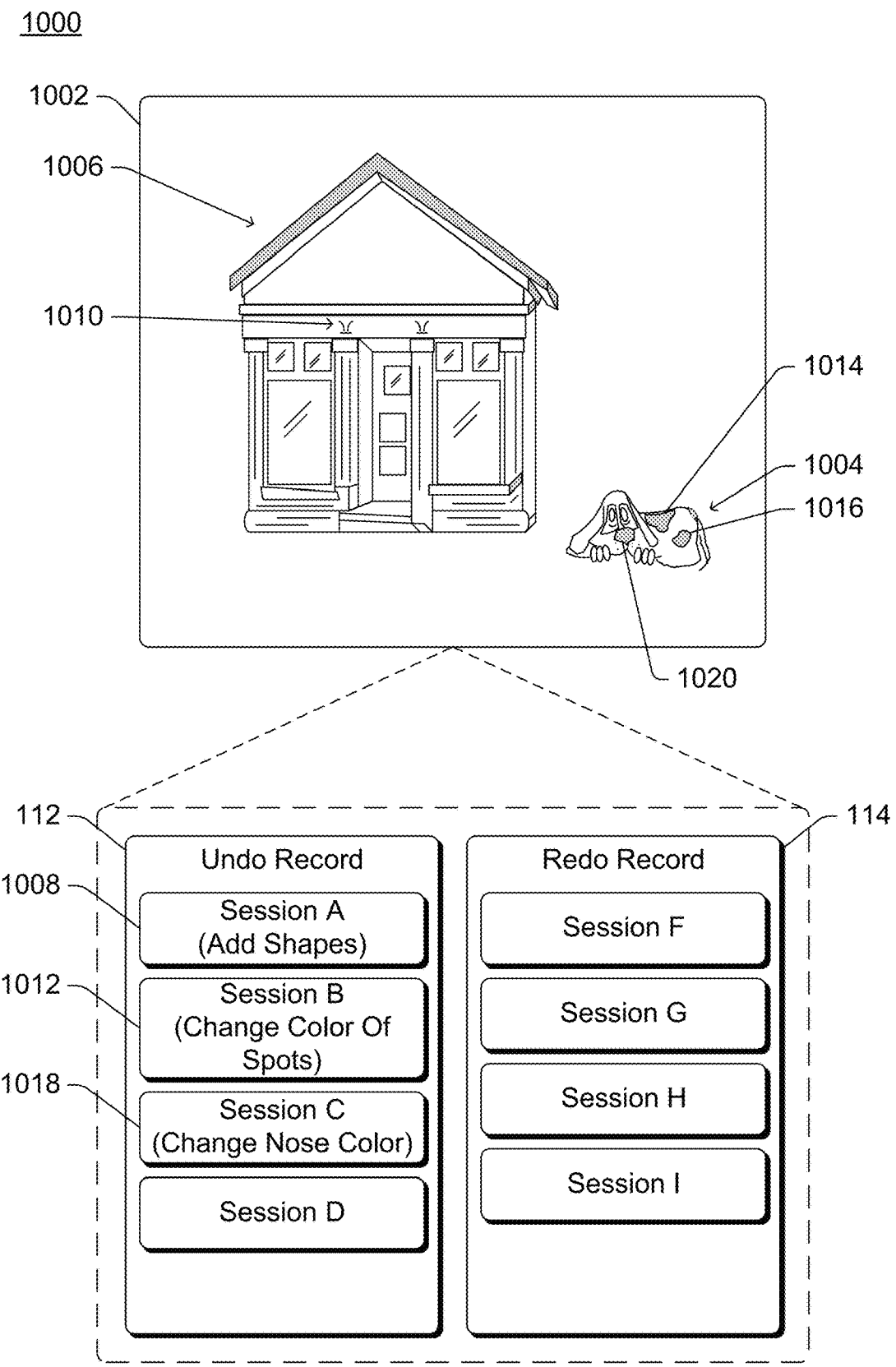

By way of example, FIG. 10 illustrates an example 1000 of data 1002 being edited by and displayed to a user, the displayed data 1002 being a drawing including a dog 1004 and a building 1006. Multiple sessions have previously been added to the undo record 112 and to the redo record 114. The most recent session added to the undo record 112 is a session 1008 indicating an action of adding shapes 1010 (the shapes 1010 being the objects) to the building 1006. A next most recent session added to the undo record 112 is a session 1012 indicating an action of changing the color of spots 1014 and 1016 (the spots 1014 and 1016 being the objects) on the dog 1004. A next most recent session added to the undo record 112 is a session 1018 indicating an action of changing a color of the nose 1020 (the nose 1020 being the object) of the dog 1004. Any number of additional sessions can also be included in the undo record 112. Sessions are added to the undo record 112 in a LIFO manner, so the topmost session in the undo record 112 is the session 1008.

If an object-based undo request were received and the object 1014 were the selected object for the object-based undo request, then the session 1012 (the topmost session in the undo record 112 that includes the selected object) is percolated to the top of the undo record 112. The action in the session 1012 is undone, so the color change to both of the spots 1014 and 1016 is undone. Thus, even though only the spot 1014 was a selected object for the object-based undo request, the color change to both of the objects 1014 and 1016 is undone because both of the objects 1014 and 1016 were acted on by the action in the session 1012.

A redo request can also be received in act 206. A redo request can be a document-based redo request or an object-based redo request. A document-based redo request is similar to a document-based undo request, except that the request is to redo an action rather than undo an action. An object-based redo request is similar to an object-based undo request, except that the request is to redo an action rather than undo an action.

As illustrated in FIG. 2B, in response to receipt of a document-based redo request, the action in the session at the top of the redo record is redone (act 216). The action is redone by again performing the action indicated in the session. Thus, each of the one or more objects identified in the topmost session of the redo record are returned to its state prior to the action having been undone.

The session at the top of the redo record is also moved to the top of the undo record (act 218). The moved session is thus no longer included in the redo record. Process 200 then returns to receive another undo request or redo request in act 206 of FIG. 2A, or a user edit in act 202 of FIG. 2A.

For example, referring to the example 400 of FIG. 4, in response to a redo request the action in session 308 is redone and the session 308 is moved to the top of the undo record 112. This effectively returns the undo record 112 and the redo record 114 to their state as illustrated in the example 300 of FIG. 3.

By way of another example, referring to the example 900 of FIG. 9, in response to a document-based redo request the action in session 316 is redone and the session 316 is moved to the top of the undo record 112. This effectively returns the undo record 112 and the redo record 114 to their state as illustrated in the example 800 of FIG. 8. In one or more embodiments, when redoing an action from an object-based undo, the session including the undone action is moved to the top of the undo record 112.

In response to an object-based redo request, a topmost session in the redo record that includes a selected object is identified (act 220). The object-based redo request has a corresponding one or more selected objects for which the redo operation is to be performed. The one or more selected objects can be selected by the user or selected automatically, and can be selected in any of a variety of the same manners as discussed above regarding selection of an object corresponding to an object-based undo request. In act 220, the redo record is searched in LIFO order to identify a topmost session that includes at least one of the selected objects. This searching is performed on the redo record in the same manner as searching to identify a topmost session that includes at least one of the selected objects is performed on the undo record discussed above (although is performed on the redo record rather than the undo record).

The identified session is percolated to the top of the redo record (act 222). Percolating the identified session to the top of the redo record refers to moving the identified session from its current location in the redo record to the top of the redo record. This percolating of the identified session to the top of the redo record is performed in the same manner as percolating an identified session to the top of the undo record discussed above (although is performed on the redo record rather than the undo record). If an indication of the redo record is displayed (e.g., analogous to the history list 324 of FIG. 3), a visual indication can be provided to show the percolation of the identified session to the top of the redo record (e.g., an animation showing the action in the indication of the redo record moving to the top of the redo record).

The action in the session at the top of the redo record is redone (act 216). The action is redone by again performing the action indicated in the session. Thus, each of the one or more objects identified in the topmost session of the redo record are returned to its state prior to the action having been undone. Because the identified session was percolated to the top of the undo record in act 222, the identified session is the session at the top of the redo record and thus is the session the action of which is redone.

The session at the top of the redo record is also moved to the top of the undo record (act 218). The moved session is thus no longer included in the redo record. Process 200 then returns to receive another undo request or redo request in act 206 of FIG. 2A, or a user edit in act 202 of FIG. 2A.

It should be noted that the document-based undo, the object-based undo, the document-based redo, and the object-based redo operations can be performed any number of times in any order, subject to the number of sessions in the undo record and/or redo record. For example, the total number of document-based undo operations and object-based undo operations combined is to be no greater than the number of sessions in the undo record 112.

It should also be noted that, as discussed above, an object need not be visible or fully visible to the user in order to be selected for an object-based undo or object-based redo. If a user desires to identify an object and the user knows that the object is in some area of the image but the user is not certain exactly where the object is, the user can select an area (e.g., as illustrated in FIG. 5 above) of the image. The user can perform one or more object-based undo operations until he or she sees the object change. The user now has a better understanding of where the object is, and can perform one or more document-based redo operations to redo the actions that were undone by the one or more object-based undo operations. The user now knows the location of the object and can select just the object, or can zoom in on the area and repeat the process of performing one or more object-based undo operations and document-based redo operations.

It should also be noted that although the computing device 100 of FIG. 1 is discussed herein as supporting both document-based undo and object-based undo operations, as well as document-based redo and object-based redo operations, in some situations all of these operations need not be supported. For example, the computing device 100 may support both document-based undo and object-based undo operations, but not support object-based redo operations. By way of another example, the computing device 100 may support both document-based redo and object-based redo, but not support object-based undo operations.

The techniques discussed herein support various different usage scenarios. A user is allowed to readily switch between document-based and object-based undo or redo operations as he or she desires, improving the usability of the device by giving the user the freedom and flexibility to perform undo or redo operations as he or she desires. Furthermore, by maintaining an undo record and a redo record that is shared by the document-based and object-based undo and redo operations, the complexity of maintaining different records for objects and the document as whole is avoided.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 11:
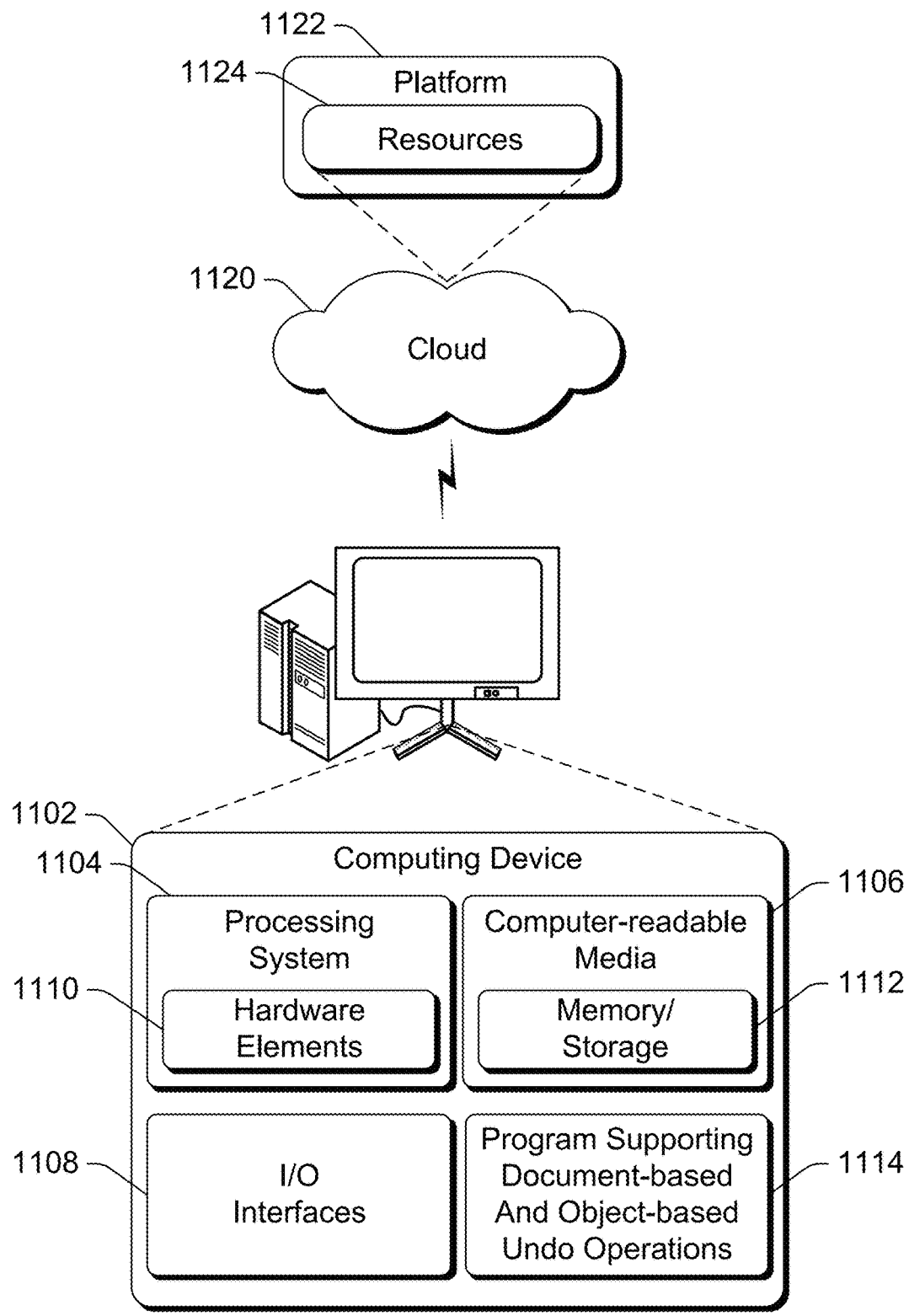
FIG. 11 illustrates an example system that includes an example computing device that is representative of one or more computing systems and/or devices that may implement the various techniques described herein.

FIG. 11 illustrates an example system generally at 1100 that includes an example computing device 1102 that is representative of one or more computing systems and/or devices that may implement the various techniques described herein. This is illustrated through inclusion of a program 1114 that supports both document-based and object-based undo operations, which may be configured to implement the techniques discussed herein. Computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1106 is illustrated as including memory/storage 1112. Memory/storage 1112 represents memory/storage capacity associated with one or more computer-readable media. Memory/storage component 1112 may include volatile media (such as random access memory (RAM)) and/or nonvolatile media (such as read only memory (ROM), Flash memory, optical disks, magnetic disks, and so forth). Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. Computing device 1102 may be configured to implement particular instructions and/or functions corresponding to the software and/or hardware modules. Accordingly, implementation of a module that is executable by computing device 1102 as software may be achieved at least partially in hardware, e.g., through use of computer-readable storage media and/or hardware elements 1110 of processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1120 via a platform 1122 as described below.

Cloud 1120 includes and/or is representative of a platform 1122 for resources 1124. Platform 1122 abstracts underlying functionality of hardware (e.g., servers) and software resources of cloud 1120. Resources 1124 may include applications and/or data that can be utilized while computer processing is executed on servers that are remote from computing device 1102. Resources 1124 can also include services provided over the Internet and/or through a subscriber network, such as a cellular or Wi-Fi network.

Platform 1122 may abstract resources and functions to connect computing device 1102 with other computing devices. Platform 1122 may also serve to abstract scaling of resources to provide a corresponding level of scale to encountered demand for resources 1124 that are implemented via platform 1122. Accordingly, in an interconnected device embodiment, implementation of functionality described herein may be distributed throughout system 1100. For example, the functionality may be implemented in part on computing device 1102 as well as via platform 1122 that abstracts the functionality of the cloud 1120.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
adding, in response to a user edit to data of a document, a session to an undo record in a last in first out manner, wherein the undo record is structured as a modified stack, wherein a modified stack allows an identified session to be percolated to the top and removed, the session indicating an action performed as part of the user edit as well as one or more objects of the data on which the action was performed, each of the one or more objects comprising a user-selectable element of the data; and
in response to receiving an object-based undo request, wherein the object-based undo request comprises an object selection of the object from a single display of the document in which the object appears, performing an object-based undo operation by:
identifying a topmost session of the undo record that includes a first selected object;
percolating the identified session to the top of the undo record; and
undoing the action in the identified session.

2. A method as recited in claim 1, the method further comprising:
in response to receiving a document-based undo request, performing a document-based undo operation by undoing an action in a session at a top of the undo record; and moving the session at the top of the undo record to a top of a redo record; and
in response to receiving the object-based undo request, moving the identified session to the top of the redo record.

3. A method as recited in claim 2, the method further comprising, in response to receiving a document-based redo request:
redoing an action in a particular session at the top of the redo record; and
moving the particular session to the top of the undo record.

4. A method as recited in claim 2, the method further comprising, in response to receiving an object-based redo request, performing an object-based redo operation by:
identifying a topmost session of the redo record that includes a second selected object;

percolating the identified session of the redo record to the top of the redo record;
redoing the action in the identified session of the redo record; and
moving the identified session of the redo record to the top of the undo record.

5. A method as recited in claim 4, the method further comprising:
in response to receiving a document-based redo request, performing a document-based redo operation by redoing an action in a particular session at a top of the redo record, and moving the particular session to the top of the undo record; and
performing each of the document-based undo operation, the object-based undo operation, the object-based redo operation, and the document-based redo operation multiple times in any order.

6. A method as recited in claim 1, the first selected object comprising a single user-selected object.

7. A method as recited in claim 1, the first selected object comprising one of multiple user-selected objects, and the identifying comprising identifying a topmost session of the undo record that includes, as one of one or more objects of the session, at least one of the multiple user-selected objects.

8. A method as recited in claim 7, further comprising displaying feedback indicating the multiple user-selected objects.

9. A method as recited in claim 7, the multiple user-selected objects including one or more objects that are invisible or partially obscured to a user.

10. A method as recited in claim 1, the method further comprising automatically selecting one or more objects based on data being displayed, and the identifying comprising identifying a session that includes at least one of the one or more objects.

11. A method comprising:
storing multiple sessions in an undo record in a last in first out manner, wherein the undo record is structured as a modified stack, wherein a modified stack allows an identified session to be percolated to the top and removed, each of the multiple sessions indicating an action performed on data of a document as well as one or more objects of the data on which the action was performed, each of the one or more objects comprising a user-selectable element of the data;
performing an object-based undo operation by:
identifying a topmost session of the undo record that includes a first selected object, wherein the object is selected from a single display of the document in which the object appears;
percolating the identified session to the top of the undo record; and
undoing the action in the identified session.

12. A method as recited in claim 11, the method further comprising, performing a document-based undo operation by undoing an action in a session at a top of the undo record, and moving the session at the top of the undo record to a top of a redo record, and the performing the object-based undo operation further comprising moving the identified session to the top of the redo record.

13. A method as recited in claim 12, the method further comprising, performing a document-based redo operation by redoing an action in a particular session at the top of the redo record, and moving the particular session to the top of the undo record.

14. A method as recited in claim 12, the method further comprising performing an object-based redo operation by:
identifying a topmost session of the redo record that includes a second selected object;
percolating the identified session of the redo record to the top of the redo record;
redoing the action in the identified session of the redo record; and
moving the identified session of the redo record to the top of the undo record.

15. A computing device comprising:
one or more computer-readable storage media embodying instructions which, when executed, implement modules comprising:
an input module configured to receive user inputs to the computing device, the user inputs identifying actions performed on data of a document displayed by the computing device;
an action logging module configured to store multiple sessions, in an undo record in a last in first out manner, wherein the undo record is structured as a modified stack, wherein a modified stack allows an identified session to be percolated to the top and removed, each session of the multiple sessions indicating an action performed as part of a user input as well as one or more objects of the data on which the action was performed, each of the one or more objects comprising a user-selectable element of the data; and
an action undo module configured to:
perform an object-based undo operation by identifying a topmost session of the undo record that includes a first selected object, wherein the object is selected from a single display of the document in which the object appears, percolating the identified session to the top of the undo record, and undoing the action in the identified session.

16. A computing device as recited in claim 15, the first selected object being at least one object of one or more user-selected objects.

17. A computing device as recited in claim 15, the first selected object being at least one of one or more automatically selected objects that are automatically selected in a hierarchical manner based on which of multiple hierarchical levels of the document is being operated on.

18. A computing device as recited in claim 15, the action undo module being further configured to perform a document-based undo operation by undoing an action in a session at a top of the undo record; and perform the document-based undo operation by moving the session at the top of the undo record to a top of a redo record, and perform the object-based undo operation by moving the identified session to the top of the redo record.

19. A computing device as recited in claim 18, further comprising an action redo module configured to perform a document-based redo operation by redoing an action in a particular session at the top of the redo record, and moving the particular session to the top of the undo record.

20. A computing device as recited in claim 18, further comprising an action redo module configured to perform an object-based redo operation by:
identifying a topmost session of the redo record that includes a second selected object;
percolating the identified session of the redo record to the top of the redo record;
redoing the action in the identified session of the redo record; and moving the identified session of the redo record to the top of the undo record.

\* \* \* \* \*